(12) United States Patent
Wilcox

(10) Patent No.: US 11,730,156 B2
(45) Date of Patent: *Aug. 22, 2023

(54) RENEWABLE NATURAL FIBER FISHING LINE

(71) Applicant: Loren James Wilcox, Pinedale, WY (US)

(72) Inventor: Loren James Wilcox, Pinedale, WY (US)

( * ) Notice: Subject to any disclaimer, the term of this patent is extended or adjusted under 35 U.S.C. 154(b) by 976 days.

This patent is subject to a terminal disclaimer.

(21) Appl. No.: 16/376,377

(22) Filed: Apr. 5, 2019

(65) Prior Publication Data

US 2019/0307111 A1 Oct. 10, 2019

Related U.S. Application Data

(60) Provisional application No. 62/653,751, filed on Apr. 6, 2018.

(51) Int. Cl.
*A01K 91/00* (2006.01)
*D07B 5/02* (2006.01)
(Continued)

(52) U.S. Cl.
CPC ............. *A01K 91/00* (2013.01); *D04C 1/12* (2013.01); *D07B 1/162* (2013.01); *D07B 5/02* (2013.01);
(Continued)

(58) Field of Classification Search
CPC .. D04C 1/12; A01K 91/00; D07B 2201/1096; D07B 2201/2087; D07B 2201/2092;
(Continued)

(56) References Cited

U.S. PATENT DOCUMENTS 1,602,312 A * 10/1926 Fugen Qurin ........... D07B 1/02
   87/1
RE19,019 E * 12/1933 Metcalf ..................... F16G 9/00
   57/241

(Continued)

FOREIGN PATENT DOCUMENTS

| CN | 108796659 A | 11/2018 | |
| EP | 666364 A2 * | 8/1995 | ............... D07B 1/12 |
| JP | 04334448 A * | 11/1992 | |

OTHER PUBLICATIONS

"Singeing—Types of Singeing process—Application of Singeing in the textiles dyeing industry", Textile Scholars, May 2019, provided in electronic format at: https://textilesscholars.blogspot.com/2019/05/singeing-application-processes-of.html, 8 pages.

(Continued)

*Primary Examiner* — Shaun R Hurley
(74) *Attorney, Agent, or Firm* — Kagan Binder, PLLC

(57) ABSTRACT

The disclosure provides embodiments of a fishing line that includes renewable natural fibers, and a renewable natural coating. Some of the embodiments of the disclosed fishing line include, for example, a single strand line, or a braided or plaited line made from multiple threads, strands or yarns. Other embodiments of the disclosed fishing line are degradable over a predetermined timeline. These embodiments are preferred because of the low environmental impact of the disclosed fishing lines.

16 Claims, 16 Drawing Sheets

(51) Int. Cl.
*D07B 1/16* (2006.01)
*D07B 1/12* (2006.01)
*D04C 1/12* (2006.01)

(52) U.S. Cl.
CPC ............... *D07B 2201/102* (2013.01); *D07B 2201/1096* (2013.01); *D07B 2201/2087* (2013.01); *D07B 2201/2092* (2013.01); *D07B 2205/103* (2013.01); *D07B 2501/2038* (2013.01); *D10B 2401/12* (2013.01)

(58) Field of Classification Search
CPC ........ D07B 2205/103; D07B 2205/106; D07B 2501/2038; D07B 5/02; D10B 2401/12
See application file for complete search history.

(56) References Cited

U.S. PATENT DOCUMENTS

| | | | | |
|---|---|---|---|---|
| 2,988,455 | A * | 6/1961 | Rosenberg | C08L 1/28 536/123 |
| 5,446,079 | A | 8/1995 | Buchanan et al. | |
| 2003/0050667 | A1* | 3/2003 | Grafton | A61B 17/06166 606/228 |
| 2008/0300683 | A1* | 12/2008 | Altman | A61F 2/08 623/13.14 |
| 2010/0249332 | A1 | 9/2010 | Ferguson | |
| 2011/0264139 | A1* | 10/2011 | Hunter | A61L 17/005 606/228 |
| 2012/0029561 | A1* | 2/2012 | Olson | D07B 1/148 606/228 |
| 2013/0309295 | A1* | 11/2013 | Gatenholm | A61L 27/54 424/444 |
| 2014/0223799 | A1* | 8/2014 | Bossone, III | A01K 85/10 43/42.19 |
| 2015/0073474 | A1* | 3/2015 | Hodgkinson | A61B 17/06166 606/228 |
| 2015/0148823 | A1* | 5/2015 | Mortarino | A61F 2/12 606/151 |
| 2019/0142993 | A1* | 5/2019 | Parikh | D01D 5/0023 606/231 |
| 2019/0307111 | A1 | 10/2019 | Wilcox | |

OTHER PUBLICATIONS

Vieira, M., et al. (2011) "Natural-based plasticizers and biopolymer films: A review", European Polymer Journal, 47:254-263.
Vaha-Nissi, M., et al. (2010) "Aqueous Dispersions from Biodegradable/Renewable Polymers", VTT Technical Research Centre of Finland, Espoo, Rajamiiki, Finland, pp. 1-14.
Nomura et al. (2007) "PHA synthase engineering toward superbiocatalysts for custom-made biopolymers", Appl. Microbiol. Biotech., 73:969-797.
Non-Final Office Action dated Apr. 26, 2022 for U.S. Appl. No. 17/592,125, filed Feb. 3, 2022, 10 pages.

* cited by examiner

RENEWABLE NATURAL FIBER FISHING LINE

SUMMARY

The disclosure provides embodiments of an environmentally friendly fishing line that includes renewable natural fibers, and in some embodiments the disclosed fishing line optionally includes an environmentally friendly renewable natural coating.

Some of the embodiments of the disclosed fishing line include, for example, a single strand line, or a braided or plaited line made from multiple threads, strands or yarns. Other embodiments of the disclosed fishing line are degradable over a predetermined timeline. These embodiments are preferred because of the low environmental impact of the disclosed fishing lines when compared to, for example, well known synthetic polymer fishing lines.

According to a first embodiment of the present disclosure, a renewable natural fiber fishing line is disclosed. According to the first embodiment, the renewable natural fiber fishing line includes a single strand or braided fiber line wherein the fiber is cotton, jute, hemp, silk, bamboo, linen, flax, wool, sisal, or combinations thereof, that is coated with a biopolymer selected from the group consisting of a polylactide, a polyhydroxyalkaonate, a polysaccharide, a protein, and combinations thereof.

According to a second embodiment of the present disclosure, a renewable natural fiber fishing line is disclosed. According to the second embodiment, the renewable natural fiber fishing line includes a single strand or braided fiber line single strand fiber line coated with a biopolymer, organic polymer, natural polymer, or synthetic polymer.

According to a third embodiment of the present disclosure, a method of making a renewable natural fiber fishing line is disclosed. According to the third embodiment, the method includes the steps of braiding 3 or more natural fiber strands to provide a braided line, and coating the braided line with a biopolymer.

DETAILED DESCRIPTION

Renewable Natural Fiber

Figure 1:
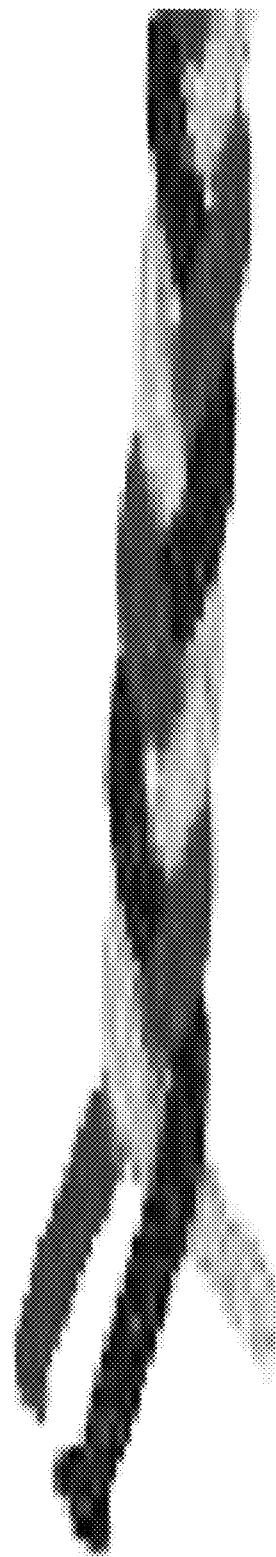
FIG. 1 is an example of a relatively simple braided pattern or design of three strands or yarns, according to various embodiments.

Suitable natural fibers for use in the manufacture of embodiments of a disclosed fishing line include, for example, cotton, jute, hemp, silk, bamboo, linen, flax, wool, and sisal. These fibers may be used alone as well as in combinations of two or more types of fibers. Those skilled in the art would readily know how to make and use various combinations of fibers in order to provide a fishing line having the desired physical characteristics of, for example, durability, elasticity, flexibility, handle-ability, slide-ability, stiffness, tensile strength, knotting, or wear.

In some embodiments, industrial hemp fibers, used alone or combined with other types of fibers, are suitable fibers. Hemp fibers are renewable and readily available from hemp plants. Hemp plants can be grown in many locations worldwide and can be grown using a variety of known cultivation or farming methods including, for example, traditional cultivation methods, organic cultivation methods and/or irrigation cultivation methods.

Hemp plants include processable fibrous materials that provide threads, strands or yarns with high strength and desirable mechanical properties. Examples of these mechanical properties are reported in US Published Patent Application 2012/0046394, incorporated by reference herein for the purposes of describing hemp fiber properties and processing. Various fibrous hemp materials can be suitable to make fishing line. These hemp fibers are processable into, for example, threads, strands or yarns. Those skilled in the art will understand that hemp fibers can be used to make a variety of types of threads, strands or yarns including, but not limited to, simple yarns, multi-ply yarns, corded yarns or textured yarns.

Natural Fishing Line

In some embodiments, a disclosed fishing line is a single strand line made from one strand or thread, while in other embodiments the disclosed fishing line is a braided or plaited line made from three or more strands or yarns. One skilled in the art will recognize that many different types and styles of single strand or braided line may be used in different embodiments of the disclosed fishing line in order to provide the fishing line with desirable physical and mechanical characteristics. In various embodiments, simple, complex, and very complex braiding designs and patterns may be used to make examples of the disclosed fishing line.

Z or S Twist Line

In various embodiments, the single strand line may be made using an either a Z or S twist technique. This technique uses twisting and folding processes to make the single strands of the natural fiber stronger by overlapping the natural fibers and the fibers may be twisted during the manufacturing process to be in either a Z or an S direction. In various embodiments, this twisting process fills the voids of the natural strands and results in a fuller and consistently consecutive single strand line. The amount of twist used during the manufacturing process makes the single strand line stronger and sturdier.

Braided Line

The disclosed fishing line may use a relatively simple braided pattern or design of two or three strands or yarns to make a braided line. For example, FIG. 1 shows a relatively simple braided pattern or design of three strands or yarns, according to various embodiments. It is to be understood that more or fewer steps can be utilized, for example, when making a braided line out of the three strands or yarns having varying lengths. Relatively shorter strands or yarn may require fewer steps to produce a braided line.

In various embodiments simple, complex and very complex braiding designs and patterns may be used to make the disclosed fishing line. In one embodiment, the disclosed fishing line may use a relatively simple braided pattern or design of three strands or yarns to make a braided line as illustrated, for example, in FIG. 1 and FIGS. 2A-2C. In other embodiments, the disclosed fishing line may use a more complex braided pattern or design of four strands or yarns to make a braided line as illustrated, for example, in FIGS. 3A-3C, 4A-4F and 5A-5E. In still other embodiments, the disclosed fishing line may use an even more complex braided pattern or design using as many as six or eight strands or yarns to make a braided line as illustrated, for example, in FIGS. 6A-6F and 7. One skilled in the art will readily recognize that a suitable braided fishing line may be made with many suitable variations of the number of stands, the size of the strands, and may be made using extremely complex braided patterns and designs to provide the disclosed braided fishing line.

Figure 2C:
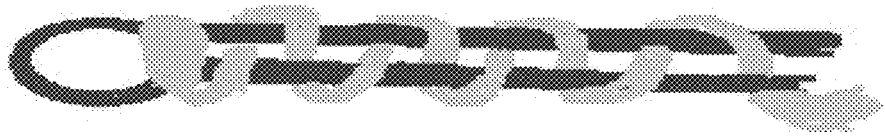
FIGS. 2A-2C show steps of making an alternative braided line; including braiding a second relatively simple braided pattern or design of three strands or yarns, according to various embodiments.
Figure 2B:
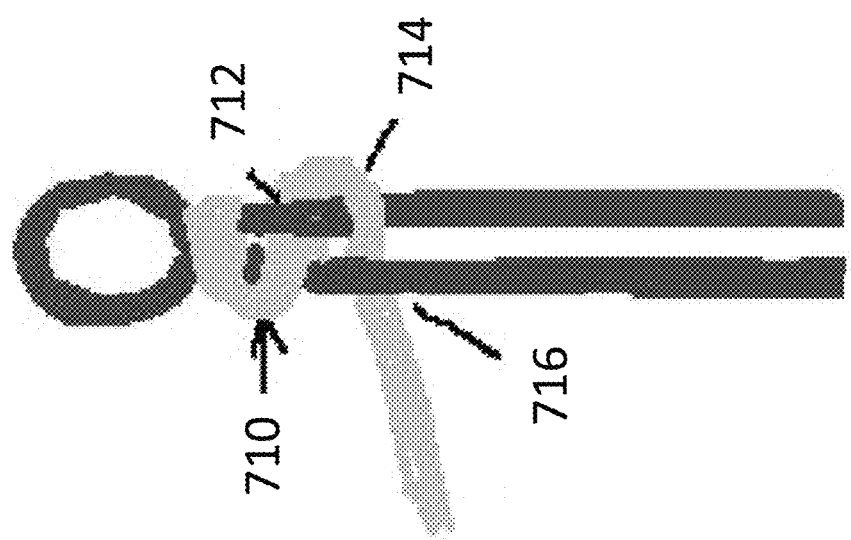
Figure 2A:
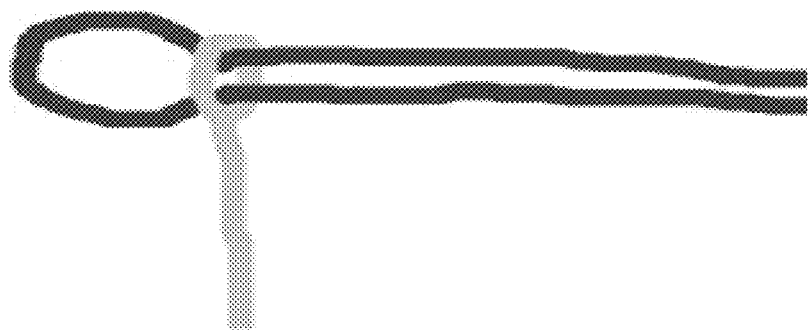

For another example, FIGS. 2A-2C show steps of making an alternative braided line; including braiding a second relatively simple braided pattern or design of three strands or yarns, according to various embodiments. FIG. 2A is a first step in making an alternative braided line of three strands or yarns, and includes a loop. FIG. 2B is a second step in making an alternative braided line of three strands or yarns. The second step shown in FIG. 2B can include four sub-steps, 710, 712, 714, and 716. A first sub-step 710 is an "over" sub-step with respect to the loop shown in FIG. 2A. A second sub-step is an "under" sub-step. A third sub-step is a "turn (on top)" sub-step. A fourth sub-step is a "repeat" sub-step, and can be repeated one or more times optionally. FIG. 2C can represent an example of a finished product according to various embodiments.

Figure 3A:
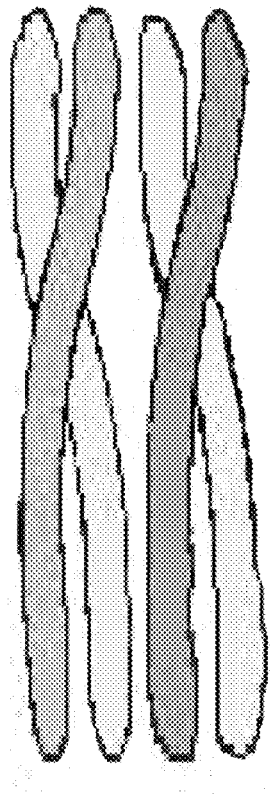
FIGS. 3A-3C show steps of making a more complex braided pattern or design of four strands or yarns, according to various embodiments.
Figure 3B:
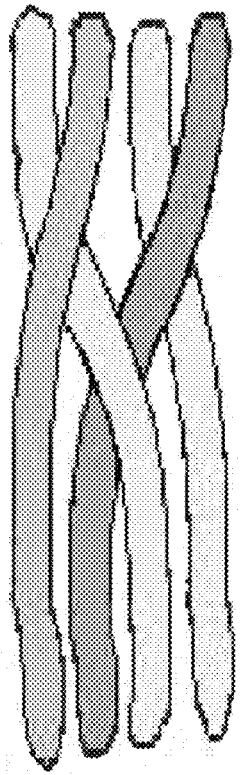
Figure 3C:
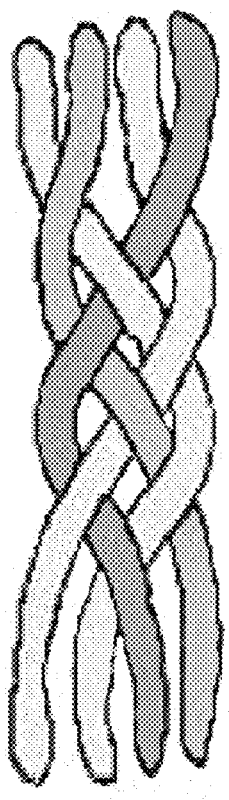

In other embodiments, the disclosed fishing line may use a more complex braided pattern or design of four strands or yarns to make a braided line. For example, FIGS. 3A-3C show steps of making a more complex braided pattern or design of four strands or yarns, according to various embodiments. FIG. 3A shows a first step in making a more complex braided pattern or design of four strands or yarns, FIG. 3B shows a second step, and FIG. 3C shows a third step, according to various embodiments.

Figure 4F:
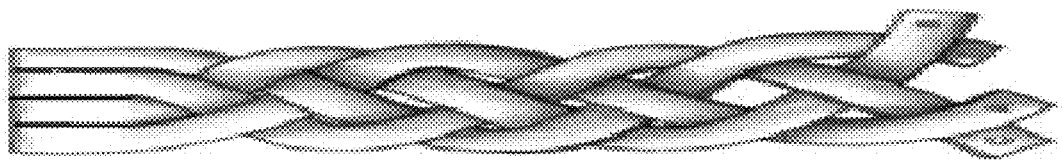
FIG. 4A-4F show steps of making an alternative more complex braided pattern or design of four strands or yarns, according to various embodiments.
Figure 4E:
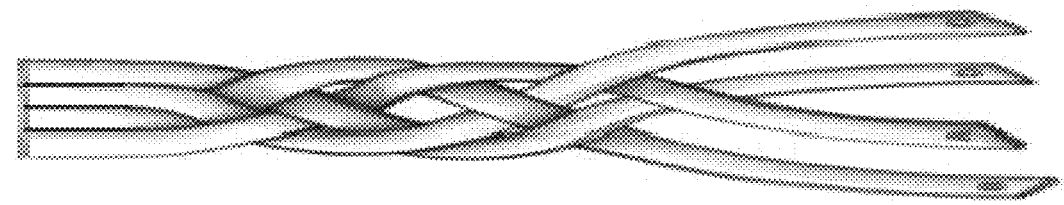
Figure 4D:
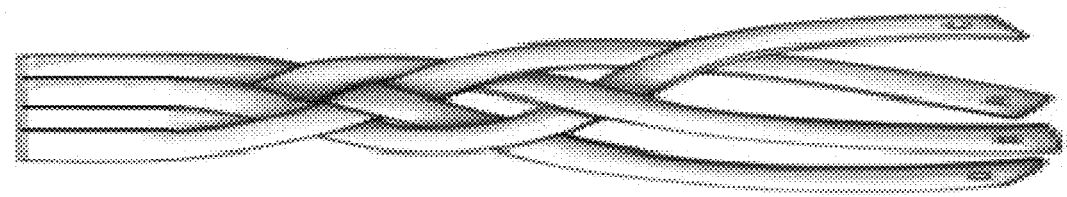
Figure 4C:
Figure 4B:
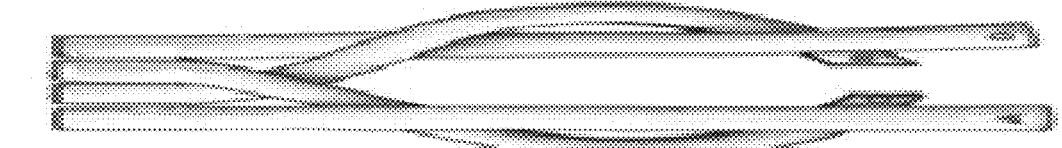
Figure 4A:
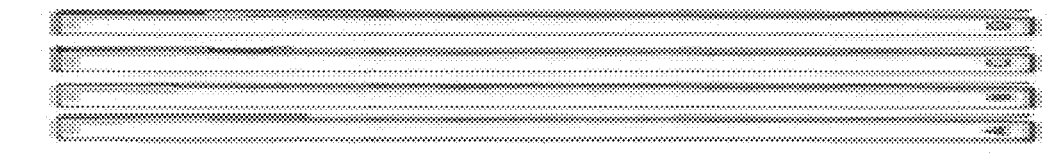
Figure 5A:
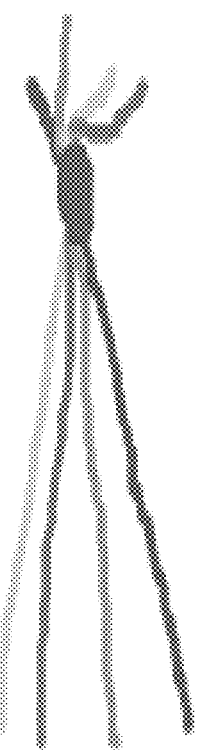
FIG. 5A-5E show steps of making another alternative more complex braided pattern or design of four strands or yarns, according to various embodiments.
Figure 5B:
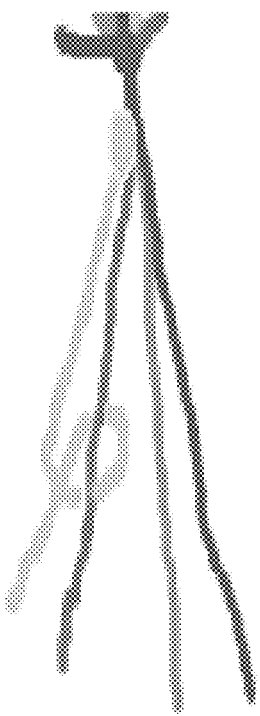
Figure 5C:
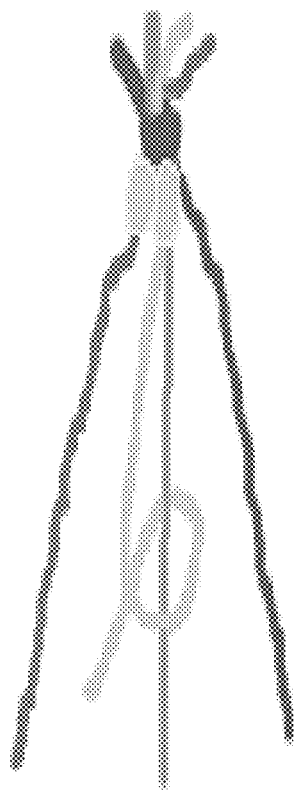
Figure 5D:
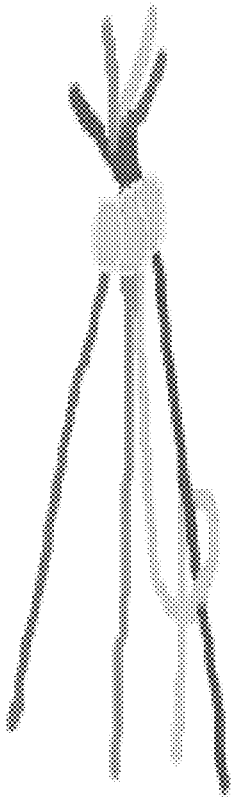
Figure 5E:
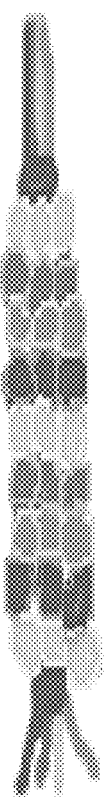
Figure 6F:
FIG. 6A-6F show steps of making an even more complex braided pattern or design of six strands or yarns, according to various embodiments.
Figure 6E:
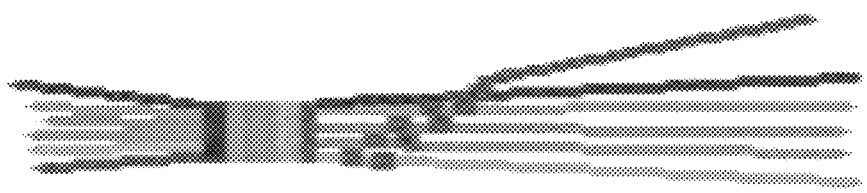
Figure 6D:
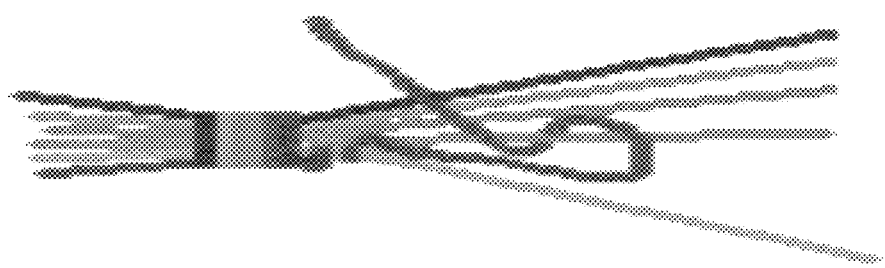
Figure 6C:
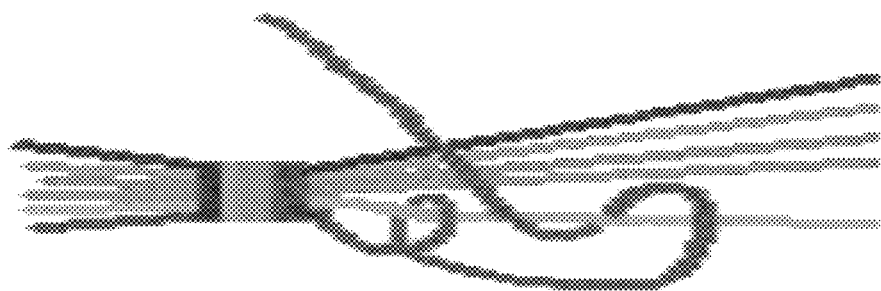
Figure 6B:
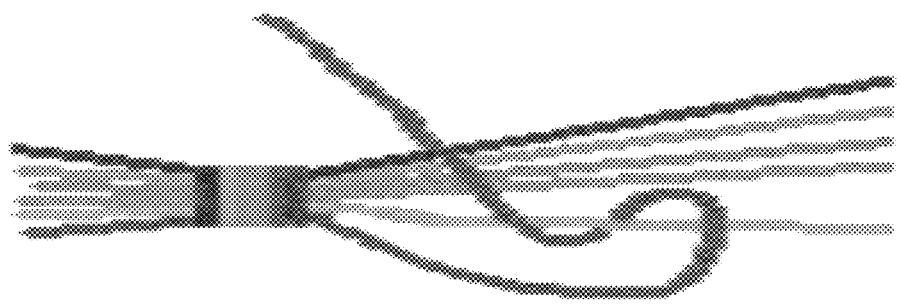
Figure 6A:
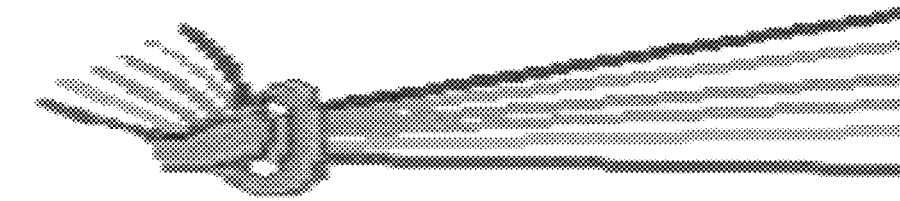

For another example, FIG. 4A-4F show steps of making an alternative more complex braided pattern or design of four strands or yarns, according to various embodiments. As shown in FIG. 4A, in a first step, four strands or yarns A, B, C, D can be presented or arranged in parallel prior to braiding. FIG. 4B shows a second step of making the alternative more complex braided pattern or design. FIG. 4C shows a third step. FIG. 4D shows a fourth step. FIG. 4E shows a fifth step. FIG. 4F shows a sixth step, according to various embodiments.

For yet another example, FIG. 5A-5E show steps of making another alternative more complex braided pattern or design of four strands or yarns, according to various embodiments. According to FIG. 5A, in a first step of making another alternative more complex braided pattern of design of four strands or yarns, four strands or yarns are joined in a knot at a first end, and are spread out at a second end. According to FIG. 5B, a second step is shown. According to FIG. 5C a third step is shown. According to FIG. 5D a fourth step is shown. According to FIG. 5E a fifth step is shown and can represent a finished complex braided pattern or design.

In still other embodiments, the disclosed fishing line may use an even more complex braided pattern or design using as many as six or eight strands or yarns to make a braided line. For example, FIG. 6A-6F show steps of making an even more complex braided pattern or design of six strands or yarns, according to various embodiments. According to FIG. 6A, in a first step of making an even more complex braided pattern of design of six strands or yarns, six strands or yarns are joined in a knot at a first end, and are spread out at a second end. According to FIG. 6B, a second step is shown. According to FIG. 6C a third step is shown. According to FIG. 6D a fourth step is shown. According to FIG. 6E a fifth step is shown. According to FIG. 6F a sixth step is shown.

Figure 7:
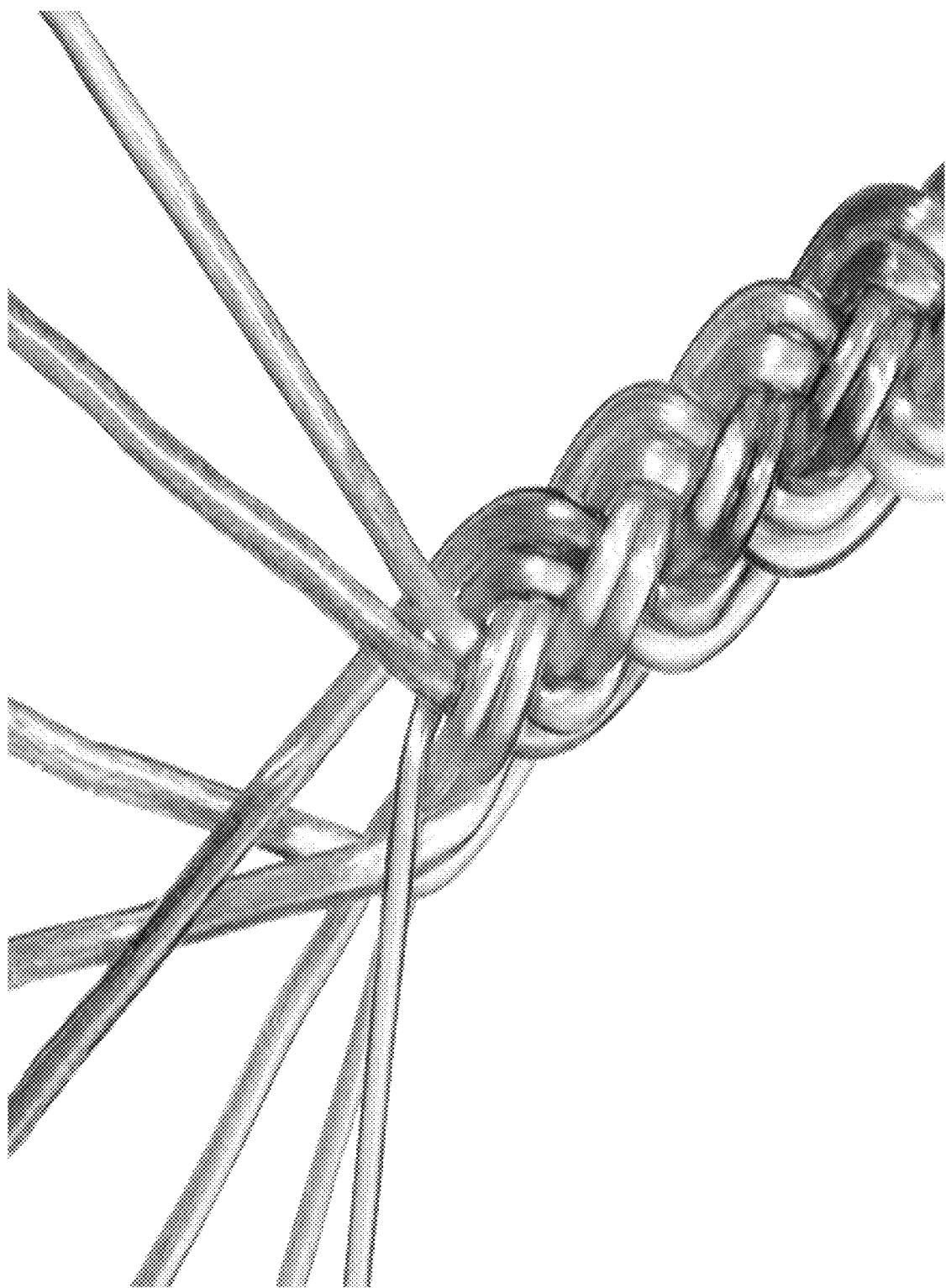
FIG. 7 show an alternative even more complex braided pattern or design of eight strands or yarns, according to various embodiments.

For another example, FIG. 7 show an alternative even more complex braided pattern or design of eight strands or yarns, according to various embodiments. As shown, pairs of strands or yarns can be braided together which can approximate a braided pattern having only four strands or yarns.

One skilled in the art will readily recognize that a suitable braided fishing line may be made with many suitable variations of the number of stands, the size of the strands, and may be made using extremely complex braided patterns and designs to provide embodiments of the disclosed braided fishing line.

Braiding Process

Embodiments of the disclosed braided fishing line may be made using well know methods and apparatuses. Suitable braiding apparatuses and machines range from relatively straightforward three-strand or yarn braiding machines to complex braiding machines that handle multiple strands to make intricately designed or patterned braided lines or materials.

Figure 8:
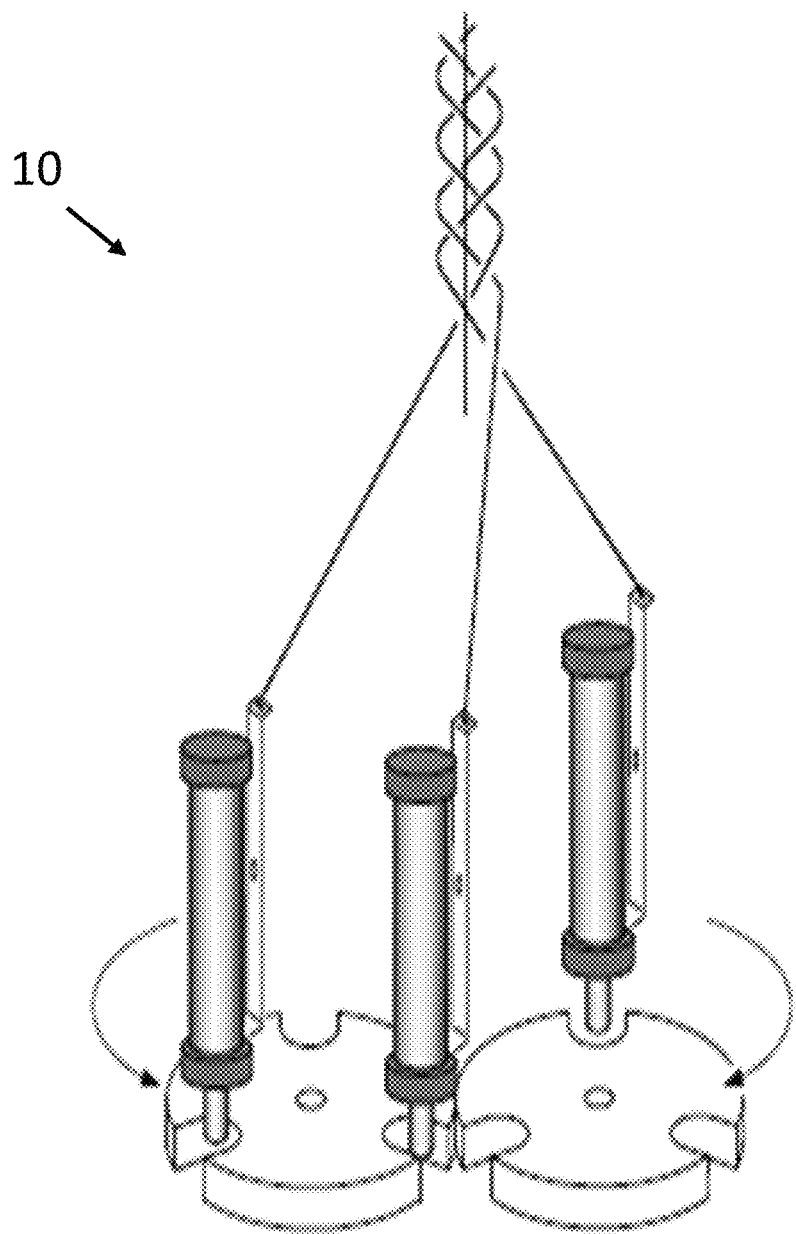
FIG. 8 is a schematic illustration of a braiding machine that braids three strands or yarns into a suitable braided fishing line, according to various embodiments.
Figure 9:
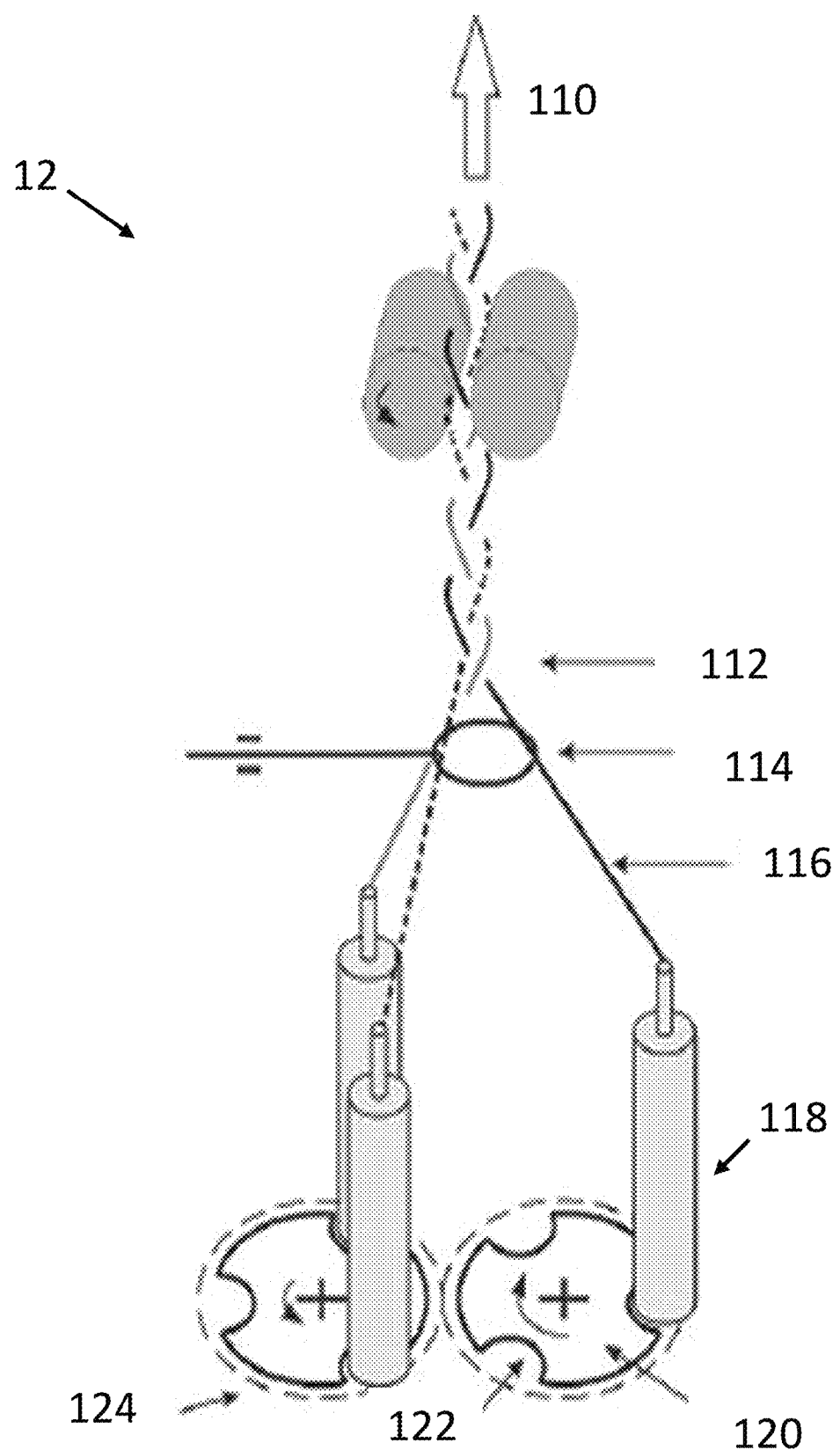
FIG. 9 is another schematic illustration of a braiding machine that braids three strands or yarns into a suitable braided fishing line, according to various embodiments.
Figure 10:
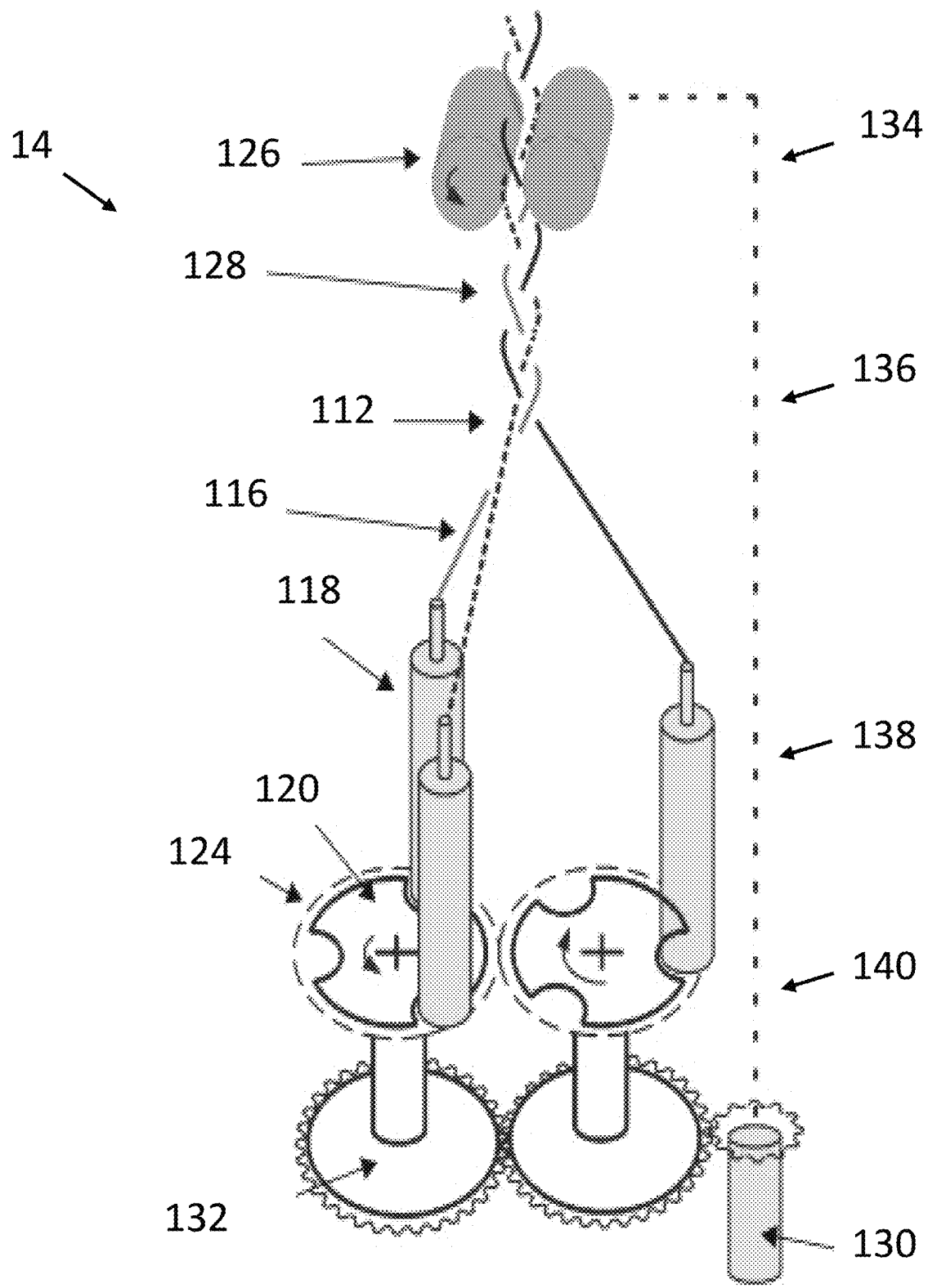
FIG. 10 is yet another schematic illustration of a braiding machine that braids three strands or yarns into a suitable braided fishing line, according to various embodiments.

For example, FIGS. 8, 9, and 10 schematically illustrate braiding machines that braid three strands or yarns into a suitable braided fishing line.

In particular, FIG. 8 is a schematic illustration of a braiding machine 10 that braids three strands or yarns into a suitable braided fishing line, according to various embodiments.

FIG. 9 is a schematic illustration of another braiding machine 12 that braids three strands or yarns into a suitable braided fishing line, according to various embodiments. As shown, one or more track 124 can include a horn gear 120 having a horn gear slot 122. A carrier 118 can be positioned in each horn gear slot 122. The carrier 118 can be a bobbin, and can hold yarn 116. As shown, three carriers 118 can collectively hold three separate bobbins with three quantities of yarn 116. A braid former or ring 114, as shown, includes a circular portion and an extension therefrom, where the circular portion surrounds the yarn 116 as it approaches a braiding point 112. Finally, a braided product 110 is output, as shown.

FIG. 10 is a schematic illustration of yet another braiding machine 14 that braids three strands or yarns into a suitable braided fishing line, according to various embodiments. The embodiment shown in FIG. 15 can be similar to the embodiment shown in FIG. 14, and can show greater detail. In addition to various components shown in FIG. 14, a braid 128 is shown following braid point 112, and take-off 126 is shown at the finishing and forming portion 134, which can include additional devices. Additionally, a motor drive 130 and a gear 132 are shown operatively coupled to the horn gears 120. As shown braiding point 112 and braid 128 can be located in a braiding zone or braiding point 136. Carrier (s) 118 can be located at a yarn transportation and compensation zone 138, and carrier feet, horn gears 120, track plate, and various driving parts (such as gears 132) are shown at carrier motion system 140.

Figure 11:
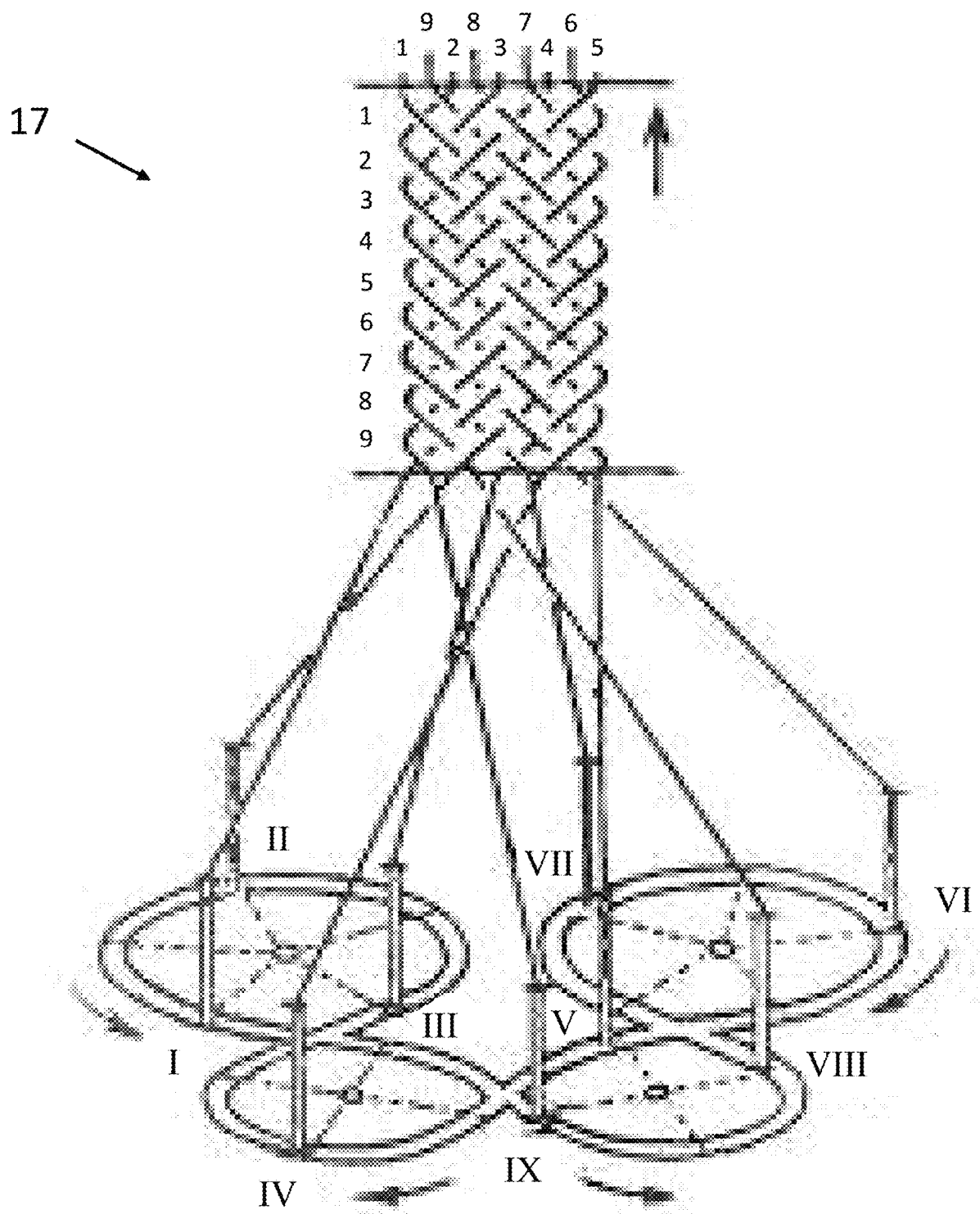
FIG. 11 is a schematic illustration of a braiding machine that braids nine strands or yarns into a suitable braided fishing line, according to various embodiments.

FIG. 11 is a schematic illustration of a braiding machine 17 that braids nine strands or yarns into a suitable braided fishing line, according to various embodiments. As shown, the nine strands originate from nine corresponding carriers/bobbins, labeled with Roman numerals, I-IX. Also shown is a finished weave or braid having rows 1-9 and columns 1-9, according to various embodiments.

Figure 12:
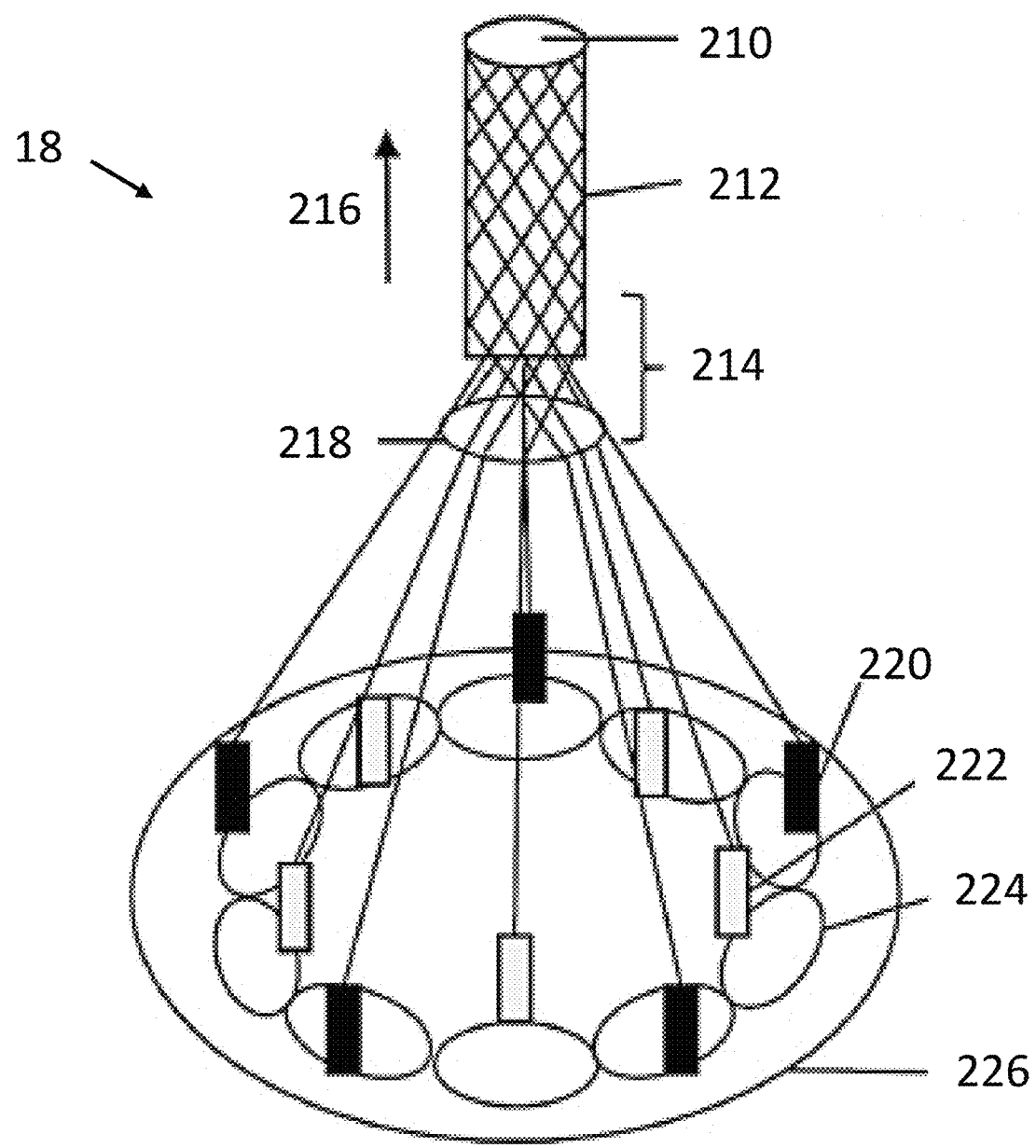
FIG. 12 is a schematic illustration of a braiding machine that braids ten strands or yarns into a suitable braided fishing line, according to various embodiments.

FIG. 12 is a schematic illustration of a braiding machine 18 that braids ten strands or yarns into a suitable braided fishing line, according to various embodiments. As shown, a mandrel 210 supports braided structures 212 after passing through a braiding zone 214 in a take-up direction 216. The braided structures 212 pass through a braiding ring 218 as yarn is received from one or more anti-clockwise bobbins 220 (e.g., carriers), and one or more clockwise bobbins 222 (e.g., carriers). A braiding track 224 in a braiding plane 226 can support bobbins 220 and 222.

Figure 13:
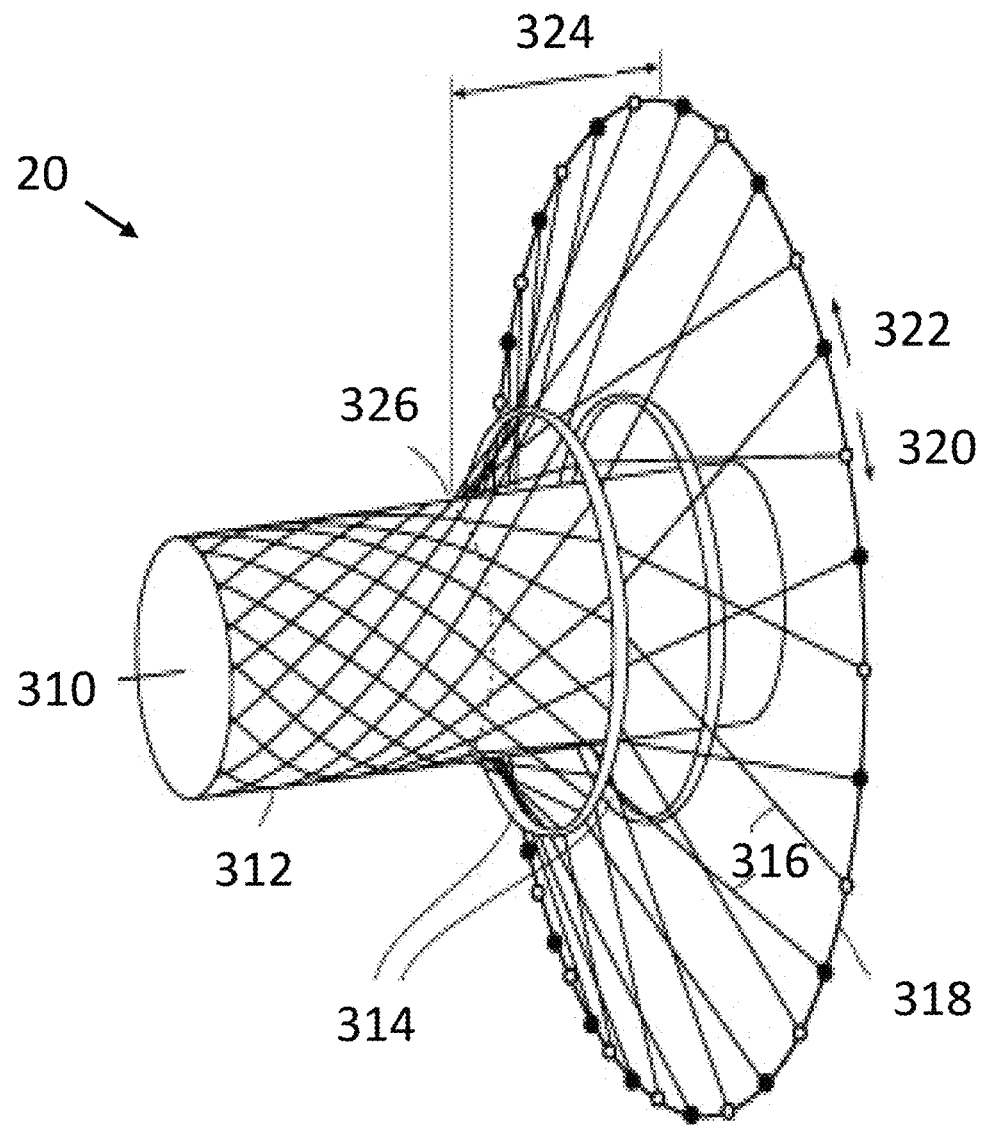
FIG. 13 is a schematic illustration of a braiding machine that braids a plurality strands or yarns into a suitable braided fishing line, according to various embodiments.
Figure 14:
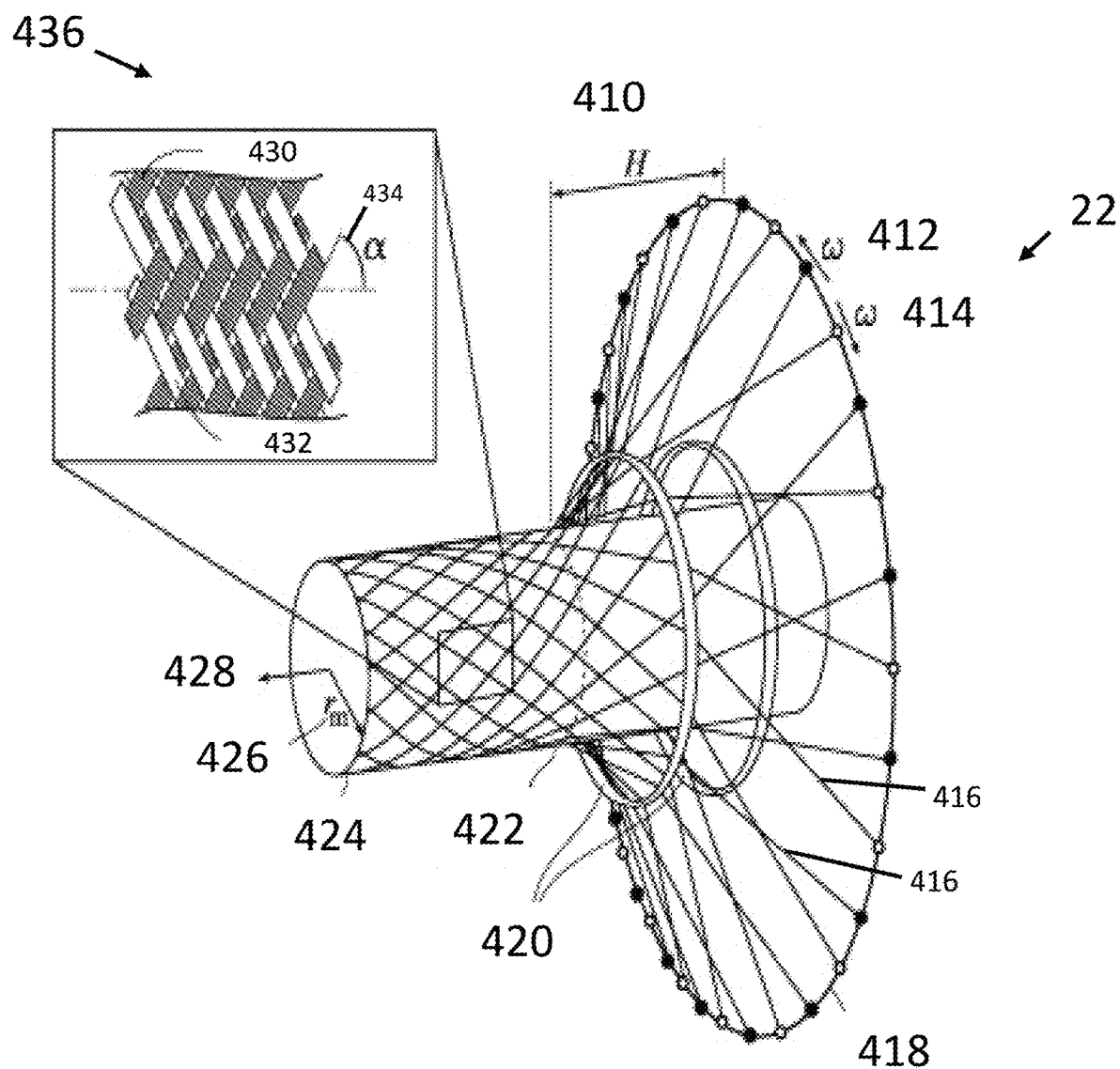
FIG. 14 is another schematic illustration of a braiding machine that braids a plurality strands or yarns into a suitable braided fishing line, according to various embodiments.
Figure 15:
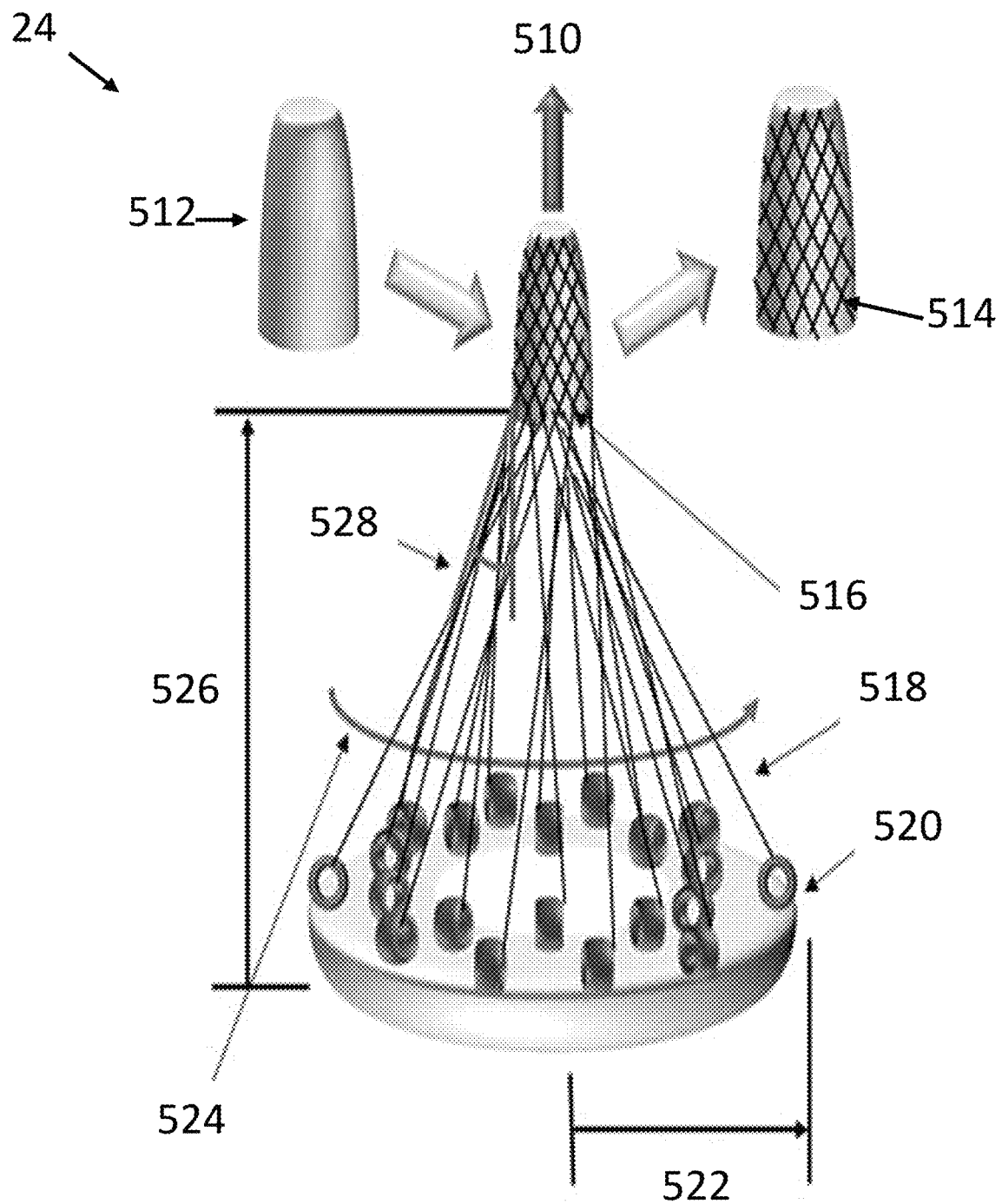
FIG. 15 is yet another schematic illustration of a braiding machine that braids a plurality strands or yarns into a suitable braided fishing line, according to various embodiments.

In still other examples, FIGS. 13, 14, and 15 schematically illustrate braiding machines that braid multiple strands or yarns into a suitable braided fishing line. FIG. 13 is a schematic illustration of a braiding machine 20 that braids a plurality strands or yarns into a suitable braided fishing line, according to various embodiments. A mandrel 312 can support a braid or weave of yarn 316 at a take-up speed 310. As shown, one or more guide rings 314 can be employed to control yarn in a convergence zone 324 during weaving. Front of fell points 326 are shown adjacent the convergence zone. A spool plane 318 can define one or more warp spools 320 and one or more weft spools 322.

FIG. 14 is a schematic illustration of another braiding machine 22 that braids a plurality strands or yarns into a suitable braided fishing line, according to various embodiments.

As shown, the braiding machine 22 is configured to braid or weave one or more yarns 416 received from guide rings 420. A convergence zone 410 can have a distance H between a spool plane 418 and a front of fell points 422. The weaving can include a weft (O) 412 and a warp (X) 414, as shown. Also shown is a mandrel 424 having a mandrel radius 426 ($r_m$) that allows for controlled weaving. During weaving, a take-up speed (v) 428 can vary according to various embodiments or can be fixed or adjusted.

A close-up of various braid features is shown at 436, and shows greater detail of an example braid, including a weft yarn 430, a warp yarn 432, and a braid angle ($\alpha$) 434.

FIG. 15 is a schematic illustration of another braiding machine 24 that braids a plurality strands or yarns into a suitable braided fishing line, according to various embodiments.

As shown, the braiding machine 24 can include a mandrel 512 that can support a braid pattern 514 on the mandrel 512. The braiding reaches the mandrel 512 at a braid point 516, and the braiding can be done using braiding yarn 518 that is stored on one or more yarn carrier (e.g., bobbins) 520. The braiding can include a take-up movement 510 (e.g., with an axial velocity: V). A guide ring can have a radius ($R_g$) 522, and an angular rotation of rotating components of the braiding machine can include an angular velocity $\omega$ 524. As shown, the convergence zone can have a length ($H_c$) 526, and a taper angle 528.

In some instances up to 96 strands (or more) can be used in suitable braiding processes that provide a braided line having an extremely complex braided pattern or design.

In one preferred process, suitable hemp strands or yarns having predetermined physical and mechanical properties and sizes are selected to provide a braided fishing line. The selected hemp stands or yarns having eight, nine, or ten strands (8 s, 9 s or 10 s), for example, are loaded or wound onto multiple bobbins of a braiding machine (such as the braiding machines illustrated in FIGS. 8-15) in specified lengths. Those skilled in the art will understand that alternate strands or yarns may include a number of different configurations. Braided fishing line may be made, for example, from strands such as 2 s, 3 s, 4 s, 8 s, 9 s, 10 s, 20, 30 s, 100 s and so on that can be similarly loaded or wound onto the braiding machine's bobbins.

After the bobbins are loaded with the strands, the bobbins are then fitting to or placed on the feed station of the braiding machine. In this embodiment, eight, nine, or ten bobbins are used. Each of the strands on the bobbins is then placed through a series of eyelets in the braiding machine in order to create the desired braiding design or pattern. When all the strands are placed, the braiding machine will start up, and begin its spinning braiding manufacturing process to produce the braided fishing line.

Using this disclosed process, a single braiding machine can produce about 8,000 feet (2438.4 meters) of fishing line in about seven days, needing only to refill and replace replenished bobbins as the strands or yarns are braided.

After the braiding process, the fishing line goes through a series of spindles and then may eventually end up being further processed with a natural, renewable, degradable coating or polymer solution. In this alternative process, the braided fishing line is dipped, sprayed, dunked or coated with a suitable coating or polymer solution. Once a coating or polymer solution is applied to the fishing line, the treated line is passed through eyelets that take off or remove excess fluid and, at the same time leaves a predetermined amount of coating or polymer on the fishing line. In some embodiments, the treated line is then sent to an oven blow dryer for an allotted time through a series of spindles in order to keep the line moving the whole time. Once the fishing line is dried, the finished line is then transferred to or wound onto large spools. In further processing, the finished fishing line may be retransferred or rewound onto smaller spools ranging in length, for example, from one to many thousands of yards (or meters) of line per spool. In a final manufacturing step, the line is transferred to retail size spools and then ultimately sent on to packaging for distribution and retail sale.

In addition to the manufacturing and finishing processes set out above, samples of the fishing line can be tested for at least tensile strength periodically throughout these processes. In an example simple test, the line is tied to an immovable object, and then pulled to its measured breaking point. The tensile strength of a braided fishing line, coated or not, may range from about one pound (4.45 Newtons) to over thousands of pounds (4,448.22 Newtons or more).

Renewable Coatings and Biopolymers

Figure 16:
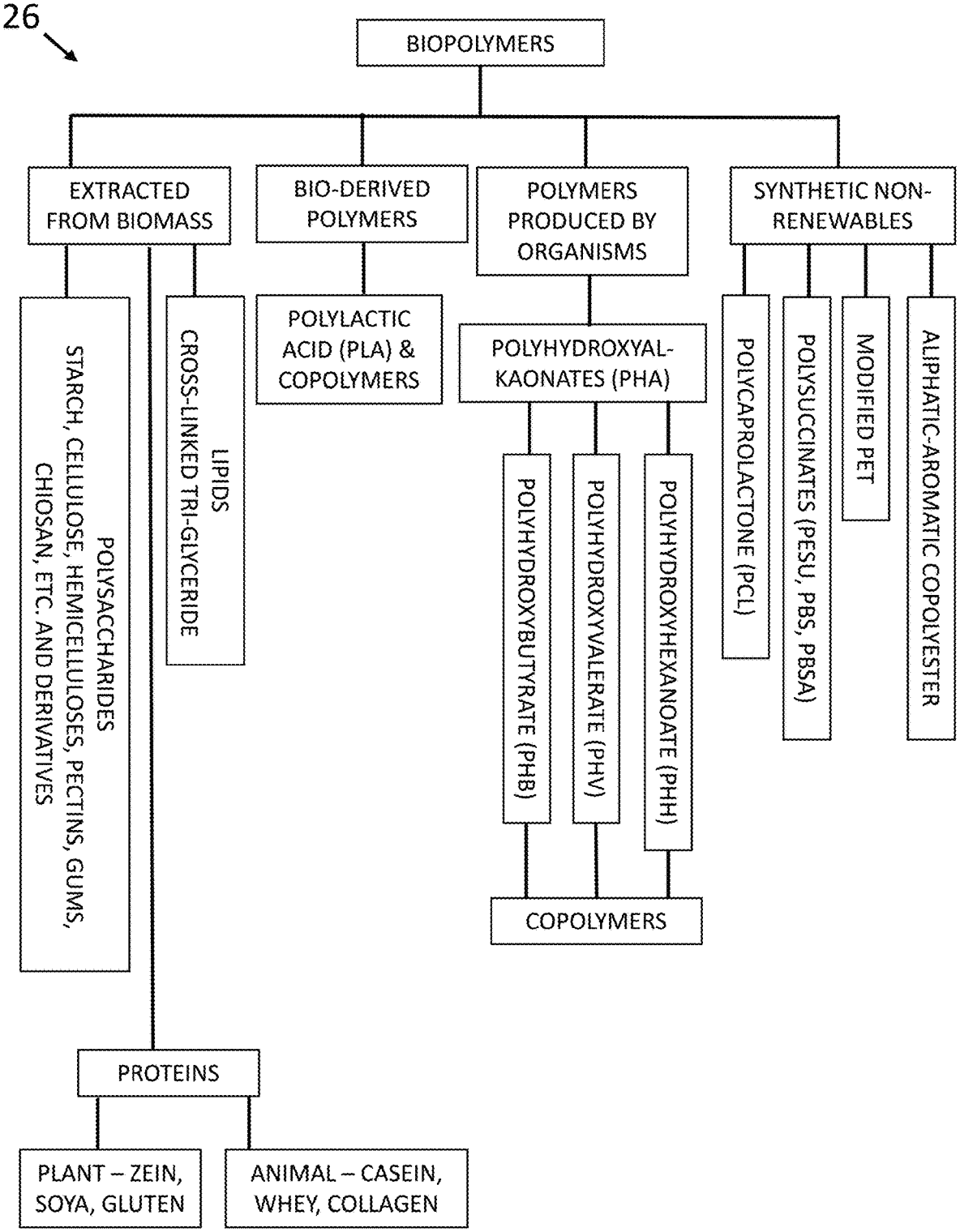
FIG. 16 is a chart of example renewable coatings and polymers, as contemplated herein.

As described herein, some embodiments of the disclosed single strand or braided fishing line include an added coating or polymer solution. A coating or polymer solution may include, for example, a biopolymer, an organic polymer, a natural polymer, and/or a synthetic polymer. In some embodiments, suitable coating or polymers are preferably environmental friendly, renewable, biodegradable materials that provide the braided fishing line with enhanced physical and mechanical properties including, but not limited to, pigment and barrier properties. Barrier properties may include, for example, a barrier against water, water vapor, grease and oil and/or other permeants. In some embodiments, suitable renewable coatings and polymers may include biopolymers such a polylactides, polyhydroxyalkaonates, polysaccharides, and/or proteins. These and other example materials are set out in chart 26 of FIG. 16.

In some embodiments, suitable biopolymers may be used to make solvent-based dispersions that are readily applied to the braided fishing line. In yet other embodiments, suitable biopolymers may be used to make aqueous dispersions that may be applied to a braided fishing line with enhanced physical and mechanical properties. Representative biopolymers include, for example, the biopolymers listed in Table 1, below.

TABLE 1

| PHA 1 | Polyhydroxybutyrate/hydroxyvalerate | Unknown |
| PLA 1 | Polylactide polymer | Nature Works |
| PLA 2 | Polylactide polymer 3051D | Nature Works |
| PCL | Polycaprolactone CAPA$^{(R)}$ 6506 | Perstorp |
| PLA 3 | Low $M_w$ lactic acid based polymer | Confidential |
| PBSA | Polybutylenesuccinate/adipate #3020 | Showa Highpolymer |
| PHA 2 | Polyhydroxyalkaonate copolymer | Confidential |
| PHA 3-5 | Polyhydroxyalkaonate copolymer | Kaneka Corp. |
| N1 and N2 | Starch nanoparticles | EcoSynthetix |

These listed biopolymers may be prepared as aqueous dispersions and used as coatings as reported in "Aqueous Dispersions from Biodegradable/Renewable Polymers," Mika Vaha-Nissi, Christiane Laine, Riku Talja, Hannu Mikkonen, Sari Hyvarinen, Ali Harlin, VTT Technical Research Centre of Finland, Espoo, Rajamiiki, Finland, pp. 1-14, 2010, incorporated by reference herein for the purpose of describing suitable renewable coatings and polymers.

Those skilled in the art will readily understand how to apply any of a variety of biopolymer materials to provide a braided fishing line as described in this disclosure.

One skilled in the art would readily recognize that alternate embodiments of the disclosed fishing line may optionally replace the renewable coatings and biopolymers set out above with commercially available or known synthetic coatings or polymer solutions. Suitable synthetic coatings or polymer solutions may alternatively be used to also provide the braided fishing line with enhanced physical and mechanical properties including, but not limited to, pigment and barrier properties. Suitable barrier properties may include, for example, a barrier against water, water vapor, grease and oil and/or other permeants. These properties may be provided by, for example, fluorocarbon polymeric or nylon polymeric coatings.

DISCLOSED EMBODIMENTS

The following summary describes various embodiments of the disclosed braided fishing line and methods of making the fishing line.

Embodiment 1

1. A renewable natural fiber fishing line, comprising: a braided fiber line optionally coated with a biopolymer, organic polymer, natural polymer, or synthetic polymer.

2. The natural fishing line of embodiment 1, wherein the fiber is cotton, jute, hemp, silk, bamboo, linen, flax, wool, sisal, or combinations thereof.

3. The natural fishing line of embodiment 1, wherein the fiber is hemp.

4. The natural fishing line of embodiment 1, wherein the fiber is biodegradable.

5. The natural fishing line of embodiment 1, wherein the biopolymer is a polylactide, a polyhydroxyalkaonate, a polysaccharide, a protein, or combinations thereof.

6. The natural fishing line of embodiment 1, wherein the biopolymer is applied to the braided fiber as an aqueous dispersion.

7. The natural fishing line of embodiment 1, wherein the biopolymer is biodegradable.

8. The natural fishing line of embodiment 1, wherein the braided fiber comprises 3 or more strands.

9. The natural fishing line of embodiment 1, wherein the braided fiber comprises 8, 9 or 10 strands.

10. The natural fishing line of embodiment 1, wherein the braided fiber comprises 9 strands.

Embodiment 11

11. A renewable natural fiber fishing line comprising a single strand fiber line coated with a biopolymer, organic polymer, natural polymer, or synthetic polymer.

12. The natural fishing line of embodiment 11, wherein the fiber is cotton, jute, hemp, silk, bamboo, linen, flax, wool, sisal, or combinations thereof.

13. The natural fishing line of embodiment 11, wherein the fiber is hemp.

14. The natural fishing line of embodiment 11, wherein the fiber is biodegradable.

15. The natural fishing line of embodiment 11, wherein the biopolymer is a polylactide, a polyhydroxyalkaonates, a polysaccharides, a proteins, or combinations thereof.

16. The natural fishing line of embodiment 11, wherein the biopolymer is applied to the fiber line as an aqueous dispersion.

17. The natural fishing line of embodiment 11, wherein the biopolymer is biodegradable.

Embodiment 18

18. A method of making a renewable natural fiber fishing line comprising the steps of braiding 3 or more natural fiber strands to provide a braided line, and coating the braided line with a biopolymer.

19. The method of embodiment 18, wherein the natural fiber strands are cotton, jute, hemp, silk bamboo, linen, flax, wool, sisal, or combinations thereof.

20. The method of embodiment 18, wherein the biopolymer is a polylactide, a polyhydroxyalkaonate, a polysaccharide, a protein, or combinations thereof.

21. The method of embodiment 18, wherein the number of strands in the braided line is 8, 9 or 10.

22. The method of embodiment 18, wherein the number of strands in the braided line is 9.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

All patents, patent applications, and publications cited herein are incorporated herein by reference in their respective entities for all purposes. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A renewable natural fiber fishing line comprising a single strand or braided fiber line wherein the fiber is jute, hemp, linen, flax, or combinations thereof, that is coated with a biopolymer selected from a polyhydroxyalkaonate biopolymer, a polysaccharide biopolymer, or combinations thereof free of polylactic acid.

2. The renewable natural fishing line of claim 1, wherein the fiber is hemp.

3. The renewable natural fishing line of claim 1, wherein the fiber is biodegradable.

4. The renewable natural fishing line of claim 1, wherein the biopolymer is applied to the single strand or braided fiber line as an aqueous dispersion.

5. The renewable natural fishing line of claim 1, wherein the biopolymer is biodegradable.

6. The renewable natural fishing line of claim 1, wherein the braided fiber line comprises 3 or more strands.

7. The renewable natural fishing line of claim 1, wherein the braided fiber line comprises 8, 9 or 10 strands.

8. The renewable natural fishing line of claim 1, wherein the braided fiber line comprises 9 strands.

9. The renewable natural fishing line of claim 1 wherein the single strand or braided fiber line comprises strands having Z or S twisted fibers.

10. A renewable natural fiber fishing line comprising a single strand fiber line or braided fiber line coated with an aqueous dispersion of a polyhydroxyalkaonate biopolymer, a polysaccharide biopolymer, or combinations thereof free of polylactic acid, wherein the fiber is jute, hemp, linen, flax, or combinations thereof.

11. The renewable natural fishing line of claim 10, wherein the fiber is hemp.

12. The renewable natural fishing line of claim 10, wherein the fiber is biodegradable.

13. The renewable natural fishing line of claim 10, wherein the biopolymer is biodegradable.

14. The renewable natural fishing line of claim 10 wherein the single strand or braided fiber line comprises strands having Z or S twisted fibers.

15. A method of making a renewable natural fiber fishing line comprising the steps of braiding 3 or more natural fiber strands to provide a braided line, and coating the braided line with a polyhydroxyalkaonate biopolymer, a polysaccharide biopolymer, or combinations thereof free of polylactic acid, wherein the fiber is jute, hemp, linen, flax, or combinations thereof.

16. The method of claim 15, wherein the number of strands in the braided line is 8, 9 or 10.

* * * * *